US012567822B2

(12) United States Patent
Kwon et al.

(10) Patent No.: US 12,567,822 B2
(45) Date of Patent: Mar. 3, 2026

(54) APPARATUS AND METHOD OF CONTROLLING A MOTOR

(71) Applicant: HYUNDAI AUTOEVER CORP., Seoul (KR)

(72) Inventors: Ki Hoon Kwon, Seoul (KR); Ji A Lee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 152 days.

(21) Appl. No.: 18/397,258

(22) Filed: Dec. 27, 2023

(65) Prior Publication Data

US 2024/0223114 A1    Jul. 4, 2024

(30) Foreign Application Priority Data

Dec. 30, 2022    (KR) ......................... 10-2022-0189999

(51) Int. Cl.
*H02P 27/08*    (2006.01)
*H02P 23/28*    (2016.01)

(52) U.S. Cl.
CPC ............ *H02P 23/28* (2016.02); *H02P 27/085* (2013.01)

(58) Field of Classification Search
CPC ............................... H02P 23/28; H02P 27/085
USPC ........................................................ 318/800
See application file for complete search history.

(56) References Cited

U.S. PATENT DOCUMENTS

| | | | |
|---|---|---|---|
| 10,581,368 B2 | 3/2020 | Fujita | |
| 10,771,005 B2 | 9/2020 | Kim | |
| 11,251,605 B2 | 2/2022 | Chon et al. | |

| | | | |
|---|---|---|---|
| 11,601,309 B1 * | 3/2023 | Rattan | ............... H04L 25/03057 |
| 2012/0143417 A1 | 6/2012 | Chung et al. | |
| 2018/0331650 A1 | 11/2018 | Fujita | |
| 2020/0059189 A1 * | 2/2020 | Ohashi | .................... H02P 27/06 |
| 2020/0144954 A1 * | 5/2020 | Kim | ...................... H02M 7/493 |
| 2021/0135606 A1 * | 5/2021 | Kwon | ........................ H02P 5/74 |
| 2021/0320492 A1 | 10/2021 | Chon et al. | |

(Continued)

FOREIGN PATENT DOCUMENTS

| | | | | |
|---|---|---|---|---|
| EP | 4135190 A1 * | 2/2023 | ............. | H02P 21/22 |
| EP | 4135191 A1 * | 2/2023 | ............. | H02P 27/08 |
| EP | 4224702 A1 * | 8/2023 | ............ | H02M 7/493 |

(Continued)

OTHER PUBLICATIONS

Office Action cited in corresponding Korean patent application No. 10-2022-0189999; May 20, 2024; 10 pp.

(Continued)

*Primary Examiner* — Gabriel Agared

(74) *Attorney, Agent, or Firm* — Lempia Summerfield Katz LLC

(57)    ABSTRACT

A controller and method for operating a plurality of capacitors of a first phase, wherein the first phase is one of a plurality of phases applied to the motor, a plurality of first switching elements of the first phase, and a plurality of second switching elements of the first phase. The plurality of capacitors charge DC voltage from a battery that applies voltage to the motor. The plurality of first switching elements convert the DC voltage to AC voltage. The plurality of second switching elements switch so that any one of the plurality of capacitors or the plurality of first switching elements is selectively connected to the motor.

20 Claims, 6 Drawing Sheets

(56)          References Cited

U.S. PATENT DOCUMENTS

2022/0077807 A1 *   3/2022   Jeong .................... H02P 27/085

FOREIGN PATENT DOCUMENTS

| EP | 4224705 A1 * | 8/2023 | .............. H02P 27/08 |
|---|---|---|---|
| EP | 4224706 A1 * | 8/2023 | .............. H02P 27/06 |
| JP | 2004120883 A | 4/2004 | |
| JP | 2011151879 A | 8/2011 | |
| KR | 20020000610 A | 1/2002 | |
| KR | 100364544 B1 | 12/2002 | |
| KR | 20120060059 A | 6/2012 | |
| KR | 101798734 B1 | 11/2017 | |
| KR | 20200051860 A | 5/2020 | |
| KR | 20210126412 A | 10/2021 | |
| WO | 2018043062 A1 | 3/2018 | |

OTHER PUBLICATIONS

Notice of Allowance cited in corresponding Korean patent application No. 10-2022-0189999; Jan. 23, 2025; 4 pp.

* cited by examiner

From. S120 determine torque of motor according to
sequence of plurality of first switching elements — S131 determine speed of motor according to conversion
speed of a plurality of switching elements — S132 set vehicle to limp home driving mode by providing
three-phase voltage controlled according to a
plurality of first switching elements to motor — S133 end

50

10                                                          40

| state | first switching element | | | | magnitude of three-phase voltage | | |
|-------|------------|------------|------------|------------|----------------|----------------|----------------|
|       | $S_1(13)$ | $S_2(14)$ | $S_3(15)$ | $S_4(16)$ | $V_{am}(41)$ | $V_{bm}(42)$ | $V_{cm}(43)$ |
| 1 | 0 | 1 | 0 | 1 | $\frac{V_{dc}}{3}$ | $-\frac{V_{dc}}{6}$ | $-\frac{V_{dc}}{6}$ |
| 2 | 0 | 1 | 1 | 0 | 0 | $-\frac{V_{dc}}{2}$ | $\frac{V_{dc}}{2}$ |
| 3 | 1 | 0 | 0 | 1 | 0 | $\frac{V_{dc}}{2}$ | $-\frac{V_{dc}}{2}$ |
| 4 | 1 | 0 | 1 | 0 | $-\frac{V_{dc}}{3}$ | $\frac{V_{dc}}{6}$ | $\frac{V_{dc}}{6}$ |

FIG. 6

APPARATUS AND METHOD OF CONTROLLING A MOTOR

CROSS REFERENCE TO RELATED APPLICATIONS

This application claims priority to and the benefit of Korean Patent Application No. 10-2022-0189999, filed on Dec. 30, 2022, in the Korean Intellectual Property Office, the disclosure of which is incorporated herein by reference in its entirety.

FIELD

The present disclosure relates to a method and system for controlling a motor in a vehicle in a situation where some elements that control a motor in a vehicle are damaged.

BACKGROUND

Limp home mode is one of the vehicle's driving modes. This is a mode, if a failure occurs in the vehicle being driven, that performs the function of self-preserving certain parts of the vehicle, such as the motor and transmission, so that the vehicle may drive safely until the necessary measures are taken.

For example, if a failure occurs in the part that controls the motor in the vehicle, it is necessary to take minimum measures by changing the driving mode to the limp home mode before the vehicle is completely unable to drive.

BRIEF SUMMARY

Embodiments of the present disclosure provide a method of configuring a replaceable circuit that may control a motor even when some elements controlling the motor are damaged, and an apparatus to which the method is applied.

Embodiments of the present disclosure further provide a method of generating voltage through a replaceable circuit that may control a motor in place of some of the damaged elements, and an apparatus to which the method is applied.

Embodiments of the present disclosure further provide a method for arbitrarily controlling the magnitude of the generated voltage according to the connection method of the replaceable circuit and an apparatus to which the method is applied.

The technical problems of the present disclosure are not limited to the technical problems mentioned above, and other technical problems not mentioned should be clearly understood by those having ordinary skill in the art from the description below.

According to an aspect of the present disclosure, a controller of a motor includes a plurality of capacitors of a first phase. In particular, the first phase is one of a plurality of phases applied to the motor. The controller further includes: a plurality of first switching elements of the first phase; and a plurality of second switching elements of the first phase. In particular, the plurality of capacitors charge DC voltage from a battery that applies voltage to the motor, and the plurality of first switching elements convert the DC voltage to AC voltage. In addition, the plurality of second switching elements switch so that any one of the plurality of capacitors or the plurality of first switching elements is selectively connected to the motor.

In some embodiments, the plurality of first switching elements of the first phase determines a torque of the motor according to a sequence of converting the DC voltage in the first phase to the AC voltage by an on-off operation of the plurality of first switching elements.

In some embodiments, the plurality of first switching elements of the first phase determine a speed of the motor using a frequency, at which the DC voltage of the first phase is converted to the AC voltage by the on-off operation of the plurality of first switching elements.

In some embodiments, the plurality of second switching elements of the first phase switch so that at least one phase of the plurality of phases is connected between the plurality of capacitors and the motor, and remaining phase is connected between the plurality of first switching elements and the motor.

In some embodiments, the method may further include a resistor between the motor and the plurality of first switching elements to control magnetic field of the motor.

According to another aspect of the present disclosure, there is provided a method performed by a controller of a motor. The method may include connecting, for a first phase, which is one of a plurality of phases applied to the motor, a plurality of capacitors connected in series to the motor instead of the plurality of first switching elements using a plurality of second switching elements, generating a three-phase voltage using a first phase including the plurality of capacitors connected in series and remaining phases each including a plurality of first switching elements and controlling magnitude of the generated three-phase voltage by an on-off operation of a plurality of first switching elements included in the remaining phases.

In some embodiments, connecting the plurality of capacitors connected in series to the motor may include: switching so that a plurality of capacitors of the first phase and a plurality of first switching elements of the first phase are connected in series, and at the same time, and any one of a plurality of capacitors of the first phase or the plurality of first switching elements of the first phase is selectively connected to the motor by an on-off operation of each of the second switching elements of the first phase.

In some embodiments connecting the plurality of capacitors connected in series to the motor may include controlling the magnetic field of the motor by adding resistance between the plurality of switching elements of the first phase.

In some embodiments controlling the magnitude of the generated three-phase voltage by an on-off operation of a plurality of first switching elements included in the remaining phases may include determining a torque of the motor according to a sequence of converting DC voltage in the remaining phases to AC voltage by an on-off operation of a plurality of first switching elements included in the remaining phases.

In some embodiments determining a torque of the motor according to a sequence of converting DC voltage in the remaining phases to AC voltage by an on-off operation of a plurality of first switching elements included in the remaining phases may include controlling magnitude of the generated three-phase voltage using pulse width modulation (PWM).

In some embodiments controlling the magnitude of the generated three-phase voltage using PWM may include controlling an average value of the generated three-phase voltage by dividing time interval of an on-off operation of a plurality of first switching elements included in the remaining phases.

In some embodiments controlling the magnitude of the generated three-phase voltage by an on-off operation of a plurality of first switching elements included in the remaining phases may include determining a speed of the motor using a frequency, at which DC voltage of the remaining phases is converted into AC voltage by an on-off operation of a plurality of first switching elements included in the remaining phases.

In some embodiments controlling the magnitude of the generated three-phase voltage by an on-off operation of a plurality of first switching elements included in the remaining phases may include providing a magnitude of the three-phase voltage generated according to an on-off operation of the plurality of first switching elements included in the remaining phases to the motor to set a driving mode of a vehicle including the motor to limp home mode.

According to another aspect of the present disclosure, a non-transitory computer-readable recording medium including program instructions is provided. The program instructions are combined with a controller of a motor implemented as a computing device and perform steps including: connecting, for a first phase, which is one of a plurality of phases applied to the motor, a plurality of capacitors connected in series to the motor instead of the plurality of first switching elements using a plurality of second switching elements, generating a three-phase voltage using a first phase including the plurality of capacitors connected in series and remaining phases each including a plurality of first switching elements, and controlling magnitude of the generated three-phase voltage by an on-off operation of a plurality of first switching elements included in the remaining phases.

In some embodiments connecting the plurality of capacitors connected in series to the motor may include switching so that a plurality of capacitors of the first phase and a plurality of first switching elements of the first phase are connected in series, and at the same time, and any one of a plurality of capacitors of the first phase or the plurality of first switching elements of the first phase is selectively connected to the motor by an on-off operation of each of the second switching elements of the first phase.

In some embodiments, connecting the plurality of capacitors connected in series to the motor may include controlling a magnetic field of the motor by adding resistance between the plurality of switching elements of the first phase.

In some embodiments controlling the magnitude of the generated three-phase voltage by an on-off operation of a plurality of first switching elements included in the remaining phases may include determining a torque of the motor according to a sequence of converting DC voltage in the remaining phases to AC voltage by an on-off operation of a plurality of first switching elements included in the remaining phases.

In some embodiments determining the torque of the motor according to a sequence of converting DC voltage in the remaining phases to AC voltage by an on-off operation of a plurality of first switching elements included in the remaining phases may include controlling a magnitude of the generated three-phase voltage using pulse width modulation (PWM).

In some embodiments controlling the magnitude of the generated three-phase voltage by an on-off operation of a plurality of first switching elements included in the remaining phases may include determining a speed of the motor using a frequency, at which DC voltage of the remaining phases is converted into AC voltage by an on-off operation of a plurality of first switching elements included in the remaining phases.

In some embodiments controlling the magnitude of the generated three-phase voltage by an on-off operation of a plurality of first switching elements included in the remaining phases may include providing a magnitude of the three-phase voltage generated according to an on-off operation of the plurality of first switching elements included in the remaining phases to the motor to set a driving mode of a vehicle including the motor to limp home mode.

BRIEF DESCRIPTION OF THE DRAWINGS

These and/or other aspects should become apparent and more readily appreciated from the following description of the embodiments, taken in conjunction with the accompanying drawings in which:

FIG. 6 depicts an example diagram illustrating, using a table, a case in which three-phase voltage is controlled according to the circuit connection state of a plurality of first switching elements according to an embodiment of the present disclosure.

DETAILED DESCRIPTION

Figure 1:
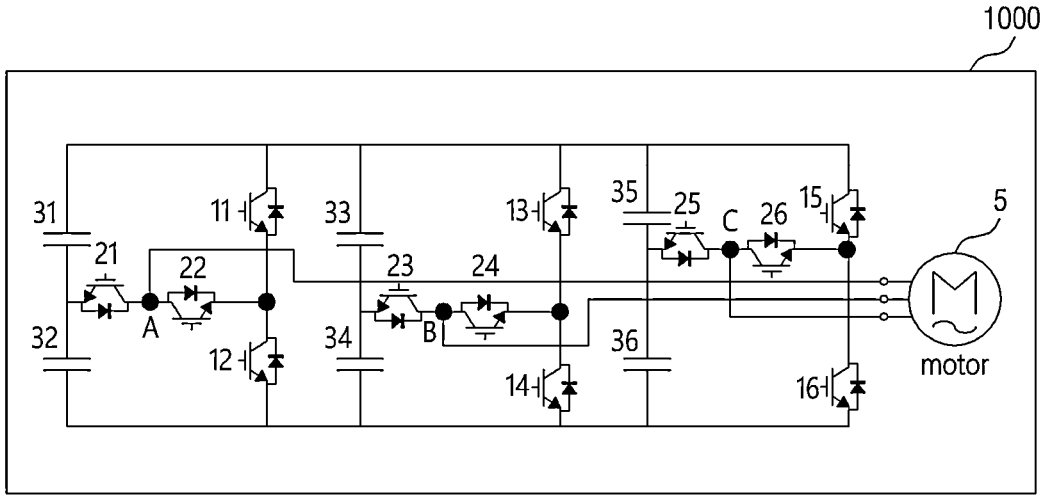
FIGS. 1 to 3 depict circuit diagrams of a motor controller according to an embodiment of the present disclosure.

Hereinafter, embodiments of the present disclosure are described with reference to the attached drawings. Advantages and features of the present disclosure and methods of accomplishing the same may be understood more readily by reference to the following detailed description of embodiments of the present disclosure and the accompanying drawings. The present disclosure may, however, be embodied in many different forms and should not be construed as being limited to the embodiments set forth herein. Rather, these embodiments are provided so that this disclosure is thorough and complete and fully conveys the concept of the disclosure to those having ordinary skill in the art, and the present disclosure will only be defined by the claims.

In addition, the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof may be omitted.

Unless otherwise defined, all terms used in the present specification (including technical and scientific terms) may be used in a sense that may be commonly understood by those having ordinary skill in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure are described with reference to the attached drawings. When a component, device, element, or the like of the present disclosure is described as having a purpose or performing an operation, function, or the like, the component, device, or element should be considered herein as being "configured to" meet that purpose or to perform that operation or function.

The configuration of the internal circuit of the motor controller according to some embodiments of the present disclosure are described with reference to FIG. 1.

FIG. 1 depicts a diagram for explaining the configuration of an internal circuit of a motor controller that generates a three-phase voltage according to an embodiment of the present disclosure.

Referring to FIG. 1, the motor control method of the present disclosure may be performed by a motor controller 1000 provided in the vehicle. Specifically, the motor control method of the present disclosure may be performed by an MCU (Motor Control Unit) that controls the motor among a plurality of controllers provided in the vehicle.

Hereinafter, in the present disclosure, for convenience of explanation, the controller that controls the internal elements of the MCU of the vehicle as the entity that implements the motor control method according to the present disclosure is referred to as a "motor controller."

Referring to FIG. 1, the motor 5 in the vehicle may operate on the principle of generating rotational force by receiving AC voltages having a certain phase difference from different phases.

Originally, the motor controller may be largely divided into a battery unit that provides power, a capacitor unit that may charge a certain amount of DC voltage from the battery unit, and an inverter unit that converts the DC voltage provided from the capacitor unit to AC voltage.

Among them, a circuit of the inverter unit may have two inverters. Typically, the circuit of the inverter unit may be composed of multiple phases, and each phase may have two inverters. Typically, the circuit of the inverter unit may be composed of three phases and may include a total of six switching elements.

For example, the greater the number of phases inside the circuit, the less power loss transmitted from the battery to the motor, but since equipment costs also increase, using three phases may provide the most cost-effective power.

Therefore, the existing motor controller may provide AC voltage converted from DC voltage to the motor through three phases, that is, the operation of a total of six switching elements. Hereinafter, in this disclosure, for convenience of explanation, the internal circuit of the motor controller 1000 is composed of three different phases, and the "AC voltage" is referred to as "three-phase voltage."

However, in embodiments of the present disclosure, when some of the six switching elements 11, 12, 13, 14, 15, and 16 inside the motor controller are unusable, the method, in which the remaining elements generate a three-phase voltage to control the motor, is covered.

Therefore, in the present disclosure, the switching elements 11, 12, 13, 14, 15 and 16 that convert DC voltage to AC voltage as the role of the existing inverter unit are referred to as "first switching elements," and for convenience of explanation, each phase includes two first switching elements. However, this may not be limited to the scope of the present disclosure.

In addition, in the present disclosure, in order to implement a case, in which some elements inside the motor controller are unusable, as a circuit according to some embodiments, a plurality of capacitors (not shown) 31, 32, 33, 34, 35, 36 charged with a certain amount of DC voltage from a battery (not shown) for each phase may be included.

In addition, in the present disclosure, according to some embodiments, the switching elements 21, 22, 23, 24, 25, and 26 that switch to selectively connect any one of a plurality of capacitors or a plurality of first switching elements included in a phase, in which some elements inside the motor controller are unusable, to the motor may be referred to as "second switching elements" and may be included.

The plurality of capacitors and the plurality of second switching elements included in each phase is set to be two for each phase. However, this may not be limited to the scope of the present disclosure.

With reference to FIG. 1, the motor controller 1000 of the present disclosure may configure a circuit, in which a three-phase voltage in three different phases is generated and provided to the motor 5. Each phase of the three different phases includes two capacitors, two first switching elements, and two second switching elements.

Specifically, there may be three different phases in the internal circuit of the motor controller, and within each phase, there are a plurality of capacitors 31, 32, 33, 34, 35, 36 that receive DC voltage from the high-voltage battery in the vehicle and charge it.

Additionally, each phase of the motor controller may include a plurality of first switching elements 11, 12, 13, 14, 15 and 16 that convert the DC voltage stored in the capacitor into AC voltage.

In addition, each phase of the motor controller may include a plurality of second switching elements 21, 22, 23, 24, 25, 26 for switching so that any one of the plurality of capacitors or the plurality of first switching elements is selectively connected to the motor.

The configuration of the internal circuit of a motor controller that generates a three-phase voltage according to embodiments of the present disclosure has been described with reference to FIG. 1.

The present disclosure describes a case of applying the generated three-phase voltage to the motor in the vehicle as one embodiment, but this may not be limited to the scope of the present disclosure, and also may be applied to other devices or other fields that handle three-phase voltage.

Hereinafter, with reference to FIG. 2, a circuit that implements an environment in which a failure occurs in some elements of a motor controller that generates a three-phase voltage is described according to embodiments of the present disclosure.

Figure 2:
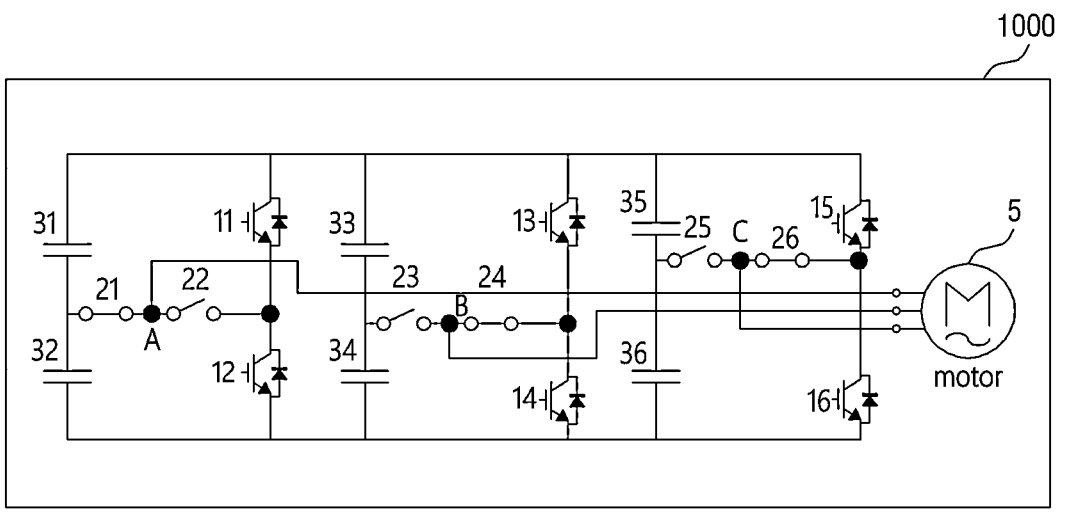

FIG. 2 depicts a diagram for explaining internal circuit connections when a failure occurs in some elements of a motor controller according to an embodiment of the present disclosure.

Referring to FIG. 2, as previously described in FIG. 1, the motor controller internal circuit may generate voltages in three different phases.

Each phase among the three different phases includes a pair of capacitors charged with a certain amount of power from a high-voltage battery in the vehicle, a pair of first switching elements that convert the DC voltage provided from the capacitors into a three-phase voltage, and a pair of second switching elements that allow any one of the pair of capacitors or the pair of first switching elements to be selectively connected to the motor.

Each switching element included in the motor controller internal circuit may include, for example, an IGBT (Insulated Gate Bipolar Transistor). However, this may not be limited to the scope of the present disclosure.

For example, each switching element included in the motor controller internal circuit may serve to convert DC voltage to a three-phase voltage like the first switching element, but may also perform the function of switching high power by being connected between a plurality of first switching elements and a plurality of capacitors, like the second switching element.

Therefore, in FIG. 2, the plurality of second switching elements are replaced with switch elements.

Therefore, when an abnormality occurs in the first switching element of the motor controller, the motor controller may generate and control a three-phase voltage by using the second switching element to connect a capacitor instead of the first switching element according to an embodiment of the present disclosure.

The phase including the first switching element, in which an abnormality occurred among the three different phases, may be set as the "first phase."

For example, according to one embodiment of the present disclosure with reference to FIG. 2, the first phase of the motor controller may include a pair of capacitors 31 and 32, a pair of first switching elements 11 and 12, and a pair of second switching elements 21 and 22.

That is, according to an embodiment of the present disclosure, when a failure occurs in the first switching element 11 or 12 of the first phase, the motor controller may connect a pair of capacitors 31 and 32 to the motor 5 instead of a pair of first switching elements 11 and 12.

Therefore, when an abnormality occurs in the first switching element 11 or 12 of the first phase, the motor controller immediately supplies the DC voltage of a pair of capacitors 31 and 32 to the motor by an on-off operation of the pair of second switching elements 21 and 22, thereby minimizing the delay in power required to drive the motor.

The configuration of a circuit, in which, when the plurality of first switching elements included in the first phase of the motor controller are unusable, a plurality of second switching elements are added to connect the capacitor to the motor instead of the first switching element, has been explained through FIG. 2. Hereinafter, the internal circuit configuration of the motor controller configured according to an embodiment of the present disclosure is described with reference to FIG. 3.

Figure 3:
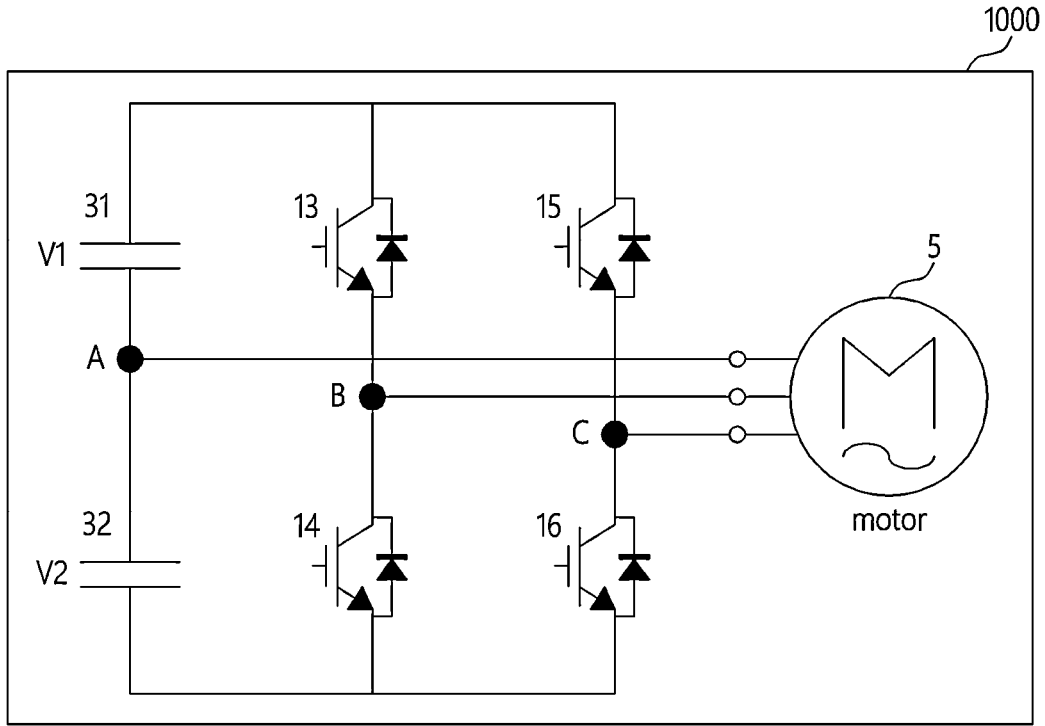

FIG. 3 depicts a diagram for explaining the configuration of an internal circuit of a motor controller that implements a motor control method according to some embodiments of the present disclosure.

Referring to FIG. 3, as previously described in FIG. 1, the motor controller 1000 may implement a case, in which an abnormality occurs in the first phase among a plurality of phases in an internal circuit that generates a three-phase voltage, according to some embodiments of the present disclosure.

In addition, as shown in FIG. 1, the motor controller 1000 may switch to connect a pair of capacitors 31, 32 to the motor 5 instead of a pair of first switching elements 11 and 12 by using a pair of second switching elements 21 and 22 in the first phase.

As a result, in FIG. 3, the motor controller 1000 may provide a voltage through a pair of capacitors 31 and 32 to the motor 5 in the first phase of the three phases connected to the motor 5 that generates a three-phase voltage.

In addition, the motor controller 1000 may provide the voltage through two pairs of first switching elements 13, 14, 15, and 16 to the motor 5, respectively, in the remaining phases except the first phase among the three phases connected to the motor 5 that generates a three-phase voltage.

The motor controller 1000 allows the power charged in the pair of capacitors 31 and 32 connected in series to be distributed and applied to the motor with a phase difference at a certain interval by the on-off operation of the plurality of second switching elements included in the first phase (A).

As a result, the motor controller 1000 may set limp home mode, in which the torque and speed of the motor is determined by supplying three-phase voltage with a phase difference at a certain interval to rotate the motor to control the driving of the vehicle for a certain portion and for a certain time.

The internal circuit configuration of a motor controller that implements a motor control method according to another embodiment of the present disclosure has been described. Hereinafter, a method of generating and controlling a three-phase voltage using the configuration of the internal circuit of the motor controller discussed above according to other embodiments of the present disclosure is described with reference to FIGS. 4 and 5.

Figure 4:
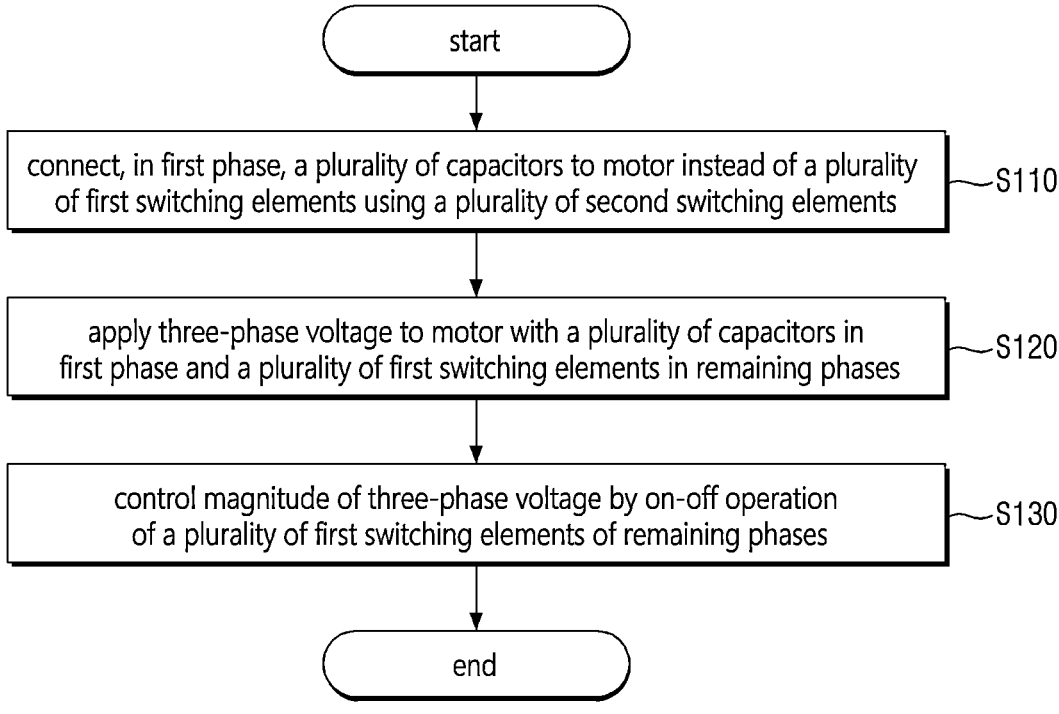
FIG. 4 depicts a flowchart of a motor control method according to an embodiment of the present disclosure.

FIG. 4 depicts a flowchart of a motor control method according to an embodiment of the present disclosure.

Before controlling the three-phase voltage, the motor controller may receive an abnormal signal from a plurality of first switching elements of the first phase within the internal circuit in order to generate the three-phase voltage.

In step S110, the motor controller may determine that some elements of the first phase in the internal circuit are in a damaged state, and connect a pair of capacitors to the motor instead of the pair of first switching elements by an on-off operation of the pair of second switching elements.

Specifically, the motor controller may connect the motor to a pair of capacitors only for the first phase, which is one of three different phases, and still connect the pair of first switching elements to the motor for the remaining two phases.

In step S120, the motor controller may apply a three-phase voltage to the motor using a pair of capacitors in the first phase and two pairs of first switching elements included in the remaining two phases.

The motor controller may not only add a capacitor to the first phase but also add a resistor to control the magnetic field of the motor. As a result, the motor controller may achieve the effect of generating high torque even at low speeds by changing the speed of the motor using the magnetic field of the motor.

In step S130, the motor controller may control the magnitude of the three-phase voltage applied to the motor according to the circuit connection state of the two pairs of first switching elements included in the remaining two phases.

For example, the magnitude of the voltage applied to the motor may be controlled in various ways by determining the connection state of the first switching elements, which are power switching elements, using the output signal of the motor controller. This is described in detail later through FIGS. 5 and 6.

As a result, the motor controller allows the driver of the vehicle to safely control the vehicle at a desired speed so that minimum safety measures may be taken when a failure occurs in some element of the motor controller.

The motor controller may adjust the magnitude of the generated three-phase voltage by combining the connection states of a pair of first switching elements, for example each of the four first switching elements, in the remaining two phases, except the first phase connected to a pair of capacitors.

The overall sequence of the motor control method according to an embodiment of the present disclosure has been described with reference to FIG. 4. Hereinafter, the motor control method described in FIG. 4 is described in more detail with reference to FIG. 5.

Figure 5:
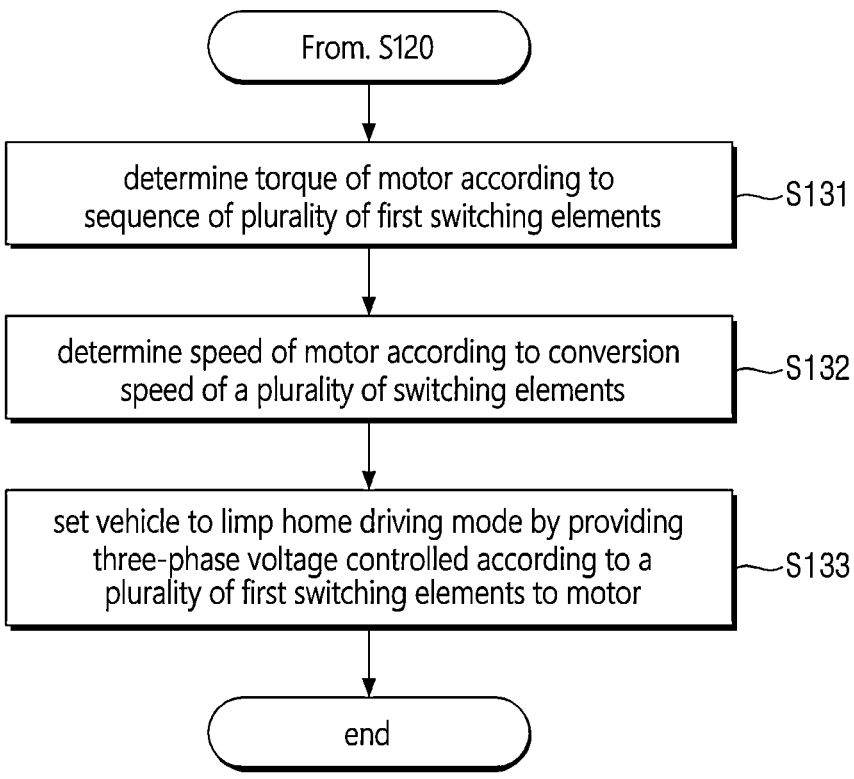
FIG. 5 depicts a detailed flowchart for explaining in more detail some operations of the motor control method described with reference to FIG. 4 according to an embodiment of the present disclosure.

FIG. 5 depicts a detailed flowchart for explaining in more detail the operation of controlling the three-phase voltage according to the connection state of the plurality of first switching elements included in the remaining two phases except the first phase in the motor controller internal circuit explained with reference to FIG. 4.

Referring to FIG. 5, in step S131, the motor may determine the torque of the motor, that is, the amount of force that causes the motor to rotate according to a sequence, in which a plurality of first switching elements included in the remaining phases except the first phase among the plurality of phases generating the three-phase voltage convert DC voltage to AC voltage.

In step S132, the motor may determine the rotation speed of the motor according to the frequency, at which the plurality of first switching elements included in the remaining phases except the first phase among the plurality of phases generating the three-phase voltage convert the DC voltage to AC voltage.

The motor controller may determine variable values that affect motor driving in the process of converting the DC voltage provided by the first phase into AC voltage by the first switching elements of the remaining phases.

The motor controller may generate three-phase voltages of various magnitudes and provide them to the motor by combining the connection states of a plurality of first switching element pairs included in the remaining phases except the first phase among the plurality of phases.

The motor controller may be set to limp home mode that allows the driver to control the vehicle at a desired speed even if a failure occurs in some elements by using the three-phase voltages of various magnitudes provided above (S133).

As a result, the motor controller may achieve the effect of allowing the driver to control the vehicle, in which an abnormality occurs, at a low speed.

A motor control method according to another embodiment of the present disclosure has been described through FIGS. 4 and 5. Hereinafter, a method of controlling the magnitude of a three-phase voltage by configuring various circuits using a motor control method according to other embodiments of the present disclosure is described with reference to the circuit diagram of FIG. 3 described above.

The following description is made assuming that a failure occurs in the first phase of the internal circuit of the motor controller. This may not be limited to the scope of the present disclosure.

In addition, referring to FIG. 3, unlike the remaining two phases, the motor controller may be connected to the motor at the midpoint (A) of a pair of series-connected capacitors instead of a plurality of first switching elements in the first phase.

Additionally, the motor controller may be connected to the motor at midpoints (B, C) dividing the two pairs of first switching elements in the remaining two phases to the upper and lower parts.

The motor may supply voltage to the motor 5 by controlling the on-off operation of the plurality of first switching elements 13, 14, 15, and 16 of the remaining two phases that receive DC voltage from the pair of capacitors 31 and 32 of the first phase.

The internal circuit of the motor controller may have four circuit connection states depending on the combination of the on-off operations of the plurality of first switching elements 13, 14, 15, and 16 of the remaining two phases of the motor controller.

When the motor controller switches to connect only the lower first switching elements to on operation among the two pairs of first switching elements included in the remaining two phases except the first phase so that the voltage charged in the lower capacitor 32 among a pair of capacitors connected in series in the first phase may be connected to the motor.

The motor controller may generate a three-phase voltage by applying the voltage charged in the lower capacitor of the first phase and the voltage through the lower first switching elements in the remaining two phases to the motor with respective phase differences. A detailed description of the magnitude of the three-phase voltage in this case is described with reference to FIG. 6.

In other embodiments, the motor controller may switch any one of the two pairs of first switching elements included in the remaining two phases so that the upper first switching element is connected to the motor in on operation, and may switch the other pair so that the lower first switching element is connected to the motor in on operation.

At this time, the motor controller may cause the voltage charged in both the pair of capacitors 31 and 32 connected in series in the first phase to be applied to the motor through each first switching element performing in on operation in the remaining phase.

Specifically, with reference to FIG. 3, the motor controller may apply a portion of the voltage charged in the pair of capacitors 31 and 32 connected in series in the first phase to the motor with each phase at points B and C through the upper first switching element 15 and the lower first switching element 14 among the plurality of first switching elements included in the remaining plurality of phases.

Also, in the opposite case, the motor may apply a portion of the voltage charged in the pair of capacitors 31 and 32 connected in series in the first phase to the motor with each phase at points B and C through the upper first switching element 13 and the lower first switching element 16 among the plurality of first switching elements included in the remaining plurality of phases.

The voltage may not be applied in the first phase, and voltages with the same magnitude but opposite signs may be applied in the remaining two phases due to the phase difference between points B and C.

The motor controller may generate a three-phase voltage by applying the voltage charged in a pair of capacitors included in the first phase to the motor with respective phase differences through the first switching elements performing on operation in the remaining two phases. A detailed description of the magnitude of the three-phase voltage in this case is described later with reference to FIG. 6.

In other embodiments, the motor controller may switch so that only the upper first switching elements of the two pairs of first switching elements included in the remaining two phases except the first phase are connected to on operation.

The motor controller may apply the voltage charged in the upper capacitor 31 of the pair of capacitors 31 and 32 connected in series in the first phase to the motor through each of the first switching elements performing on operation in the remaining phase.

The motor controller may generate a three-phase voltage by applying the voltage charged in the upper capacitor of the first phase and the voltage through the upper first switching elements in the remaining two phases to the motor with respective phase differences. A detailed description of the magnitude of the three-phase voltage in this case is described with reference to FIG. 6.

The configuration of the internal circuit of a motor controller that implements a motor control method according to some embodiments of the present disclosure has been described with reference to FIG. 3. Hereinafter, the magnitudes of some three-phase voltages controlled in the motor according to some embodiments of the present disclosure is described with reference to the table with reference to FIG. 6.

FIG. 6 depicts an example diagram for explaining a case, using a table, in which the three-phase voltage is controlled according to the circuit connection states of a plurality of first switching elements included in the remaining two phases except the first phase, according to some embodiments of the present disclosure discussed above.

Referring to the table 50 in FIG. 6, when a failure occurs in the first phase in the internal circuit of the motor controller of the present disclosure, a motor controller may check the magnitude 40 of the generated three-phase voltage depending on the connection state of a pair of capacitors connected in the first phase and the two pairs of the first switching element in the remaining phase.

The state of the first switching element, in which the motor controller switches each of the plurality of first switching elements of the remaining phases except the first phase to perform on operation may be displayed as 1.

Conversely, the state of the first switching element, in which the motor controller switches each of the plurality of first switching elements of the remaining phases except the first phase to perform off operation may be displayed as 0. This is arbitrarily set in the present disclosure and may not be limited to the scope of the present disclosure.

In the first row of the table 50 in FIG. 6, as described above through several embodiments of the present disclosure, the motor controller may allow the first switching elements 14 and 16 arranged at the bottom to perform on operation in each phase so that the voltage charged in the lower capacitor of the first phase among the plurality of first switching elements 13, 14, 15, and 16 included in the remaining two phases except for the first phase is applied.

The motor controller may apply a portion of the voltage charged in the lower capacitor of the first phase to the motor at the midpoint of the pair of capacitors of the first phase (41).

In addition, in the remaining two phases, the motor controller may apply a voltage equal to the magnitude of the voltage applied at the midpoint of a pair of capacitors in the first phase divided by the number of remaining phases, with the signs reversed. (42, 43).

Next, in the second and third rows of the table 50 of FIG. 6, as described above through several other embodiments of the present disclosure, the motor controller operates a plurality of first switching elements 13, 14, 15, 16 included in the remaining two phases except the first phase so that the first switching elements at the upper and lower parts may be alternately turned on.

The motor controller may allow a portion of the voltage charged in a pair of capacitors included in the first phase to be applied (42, 43).

Since the motor controller uses all the voltage contained in the pair of capacitors included in the first phase, the voltage applied to the motor at the midpoint of the pair of capacitors of the first phase may be 0 (41).

In addition, in the remaining two phases, the motor controller may apply a voltage equal to the magnitude of the voltage charged in a pair of capacitors of the first phase divided by the number of remaining phases, with the signs reversed (42, 43).

Next, in the fourth row of the table 50 of FIG. 6, as explained through several other embodiments of the present disclosure, the motor controller may allow the first switching elements 13 and 15 arranged at the upper part of each phase to perform on operation so that the voltage charged in the upper capacitor of the first phase is applied among the plurality of first switching elements 13, 14, 15, and 16 included in the remaining two phases except the first phase.

The motor controller may apply a portion of the voltage charged in the upper capacitor of the first phase to the motor at the midpoint of the pair of capacitors of the first phase (41).

In addition, in the remaining two phases, the motor controller may apply a voltage equal to the magnitude of the voltage applied at the midpoint of a pair of capacitors in the first phase divided by the number of remaining phases, with the signs reversed (42, 43).

As a result, the motor controller may determine the torque and speed of the motor using the three-phase voltage generated by controlling the magnitude (41, 42, 43) of the voltage applied in each phase.

Accordingly, the motor controller may enable the vehicle to drive at an arbitrary speed even when a failure occurs in a part of the vehicle. This may be understood as enabling driving in limp home mode among the driving modes of the vehicle.

Additionally, in some embodiments, as previously described with reference to FIG. 1, the motor controller may determine the voltage provided to the motor according to the sequence of converting the DC voltage supplied in the first phase into an AC voltage using a plurality of first switching elements included in the remaining phases except the first phase.

Specifically, the motor controller may control the on-off operation of the plurality of first switching elements included in the remaining phases except the first phase to determine the torque of the motor according to the sequence of converting the DC voltage transmitted from the capacitor of the first phase into AC voltage.

In addition, the motor controller may control the on-off operation of the plurality of first switching elements included in the remaining phases except the first phase to determine the speed of the motor using the speed of converting the DC voltage transmitted from the capacitor of the first phase into AC voltage.

The motor controller may determine the torque and rotation speed of a motor driven by a three-phase voltage through the on-off operation of the plurality of first switching elements, and determine a specific correlation between them.

Additionally, in some embodiments, the motor controller may control the magnitude of the three-phase voltage by using pulse width modulation (PWM) to finely divide the on-off operation time sections of the plurality of first switching elements included in the remaining phases except the first phase.

Specifically, the motor controller may effectively control the average value of the generated three-phase voltage by increasing the value of the duty cycle, which is the ratio of on state to the switching operation time of the plurality of first switching elements included in the remaining phases except the first phase.

The magnitude of the three-phase voltage controlled according to the circuit connection state of the plurality of first switching elements according to some embodiments of the present disclosure has been described through the table 50 of FIG. 6. Hereinafter, a case in which the motor controller 1000 capable of implementing the motor control method may be combined with a computing device is described in detail with reference to FIG. 7.

Figure 7:
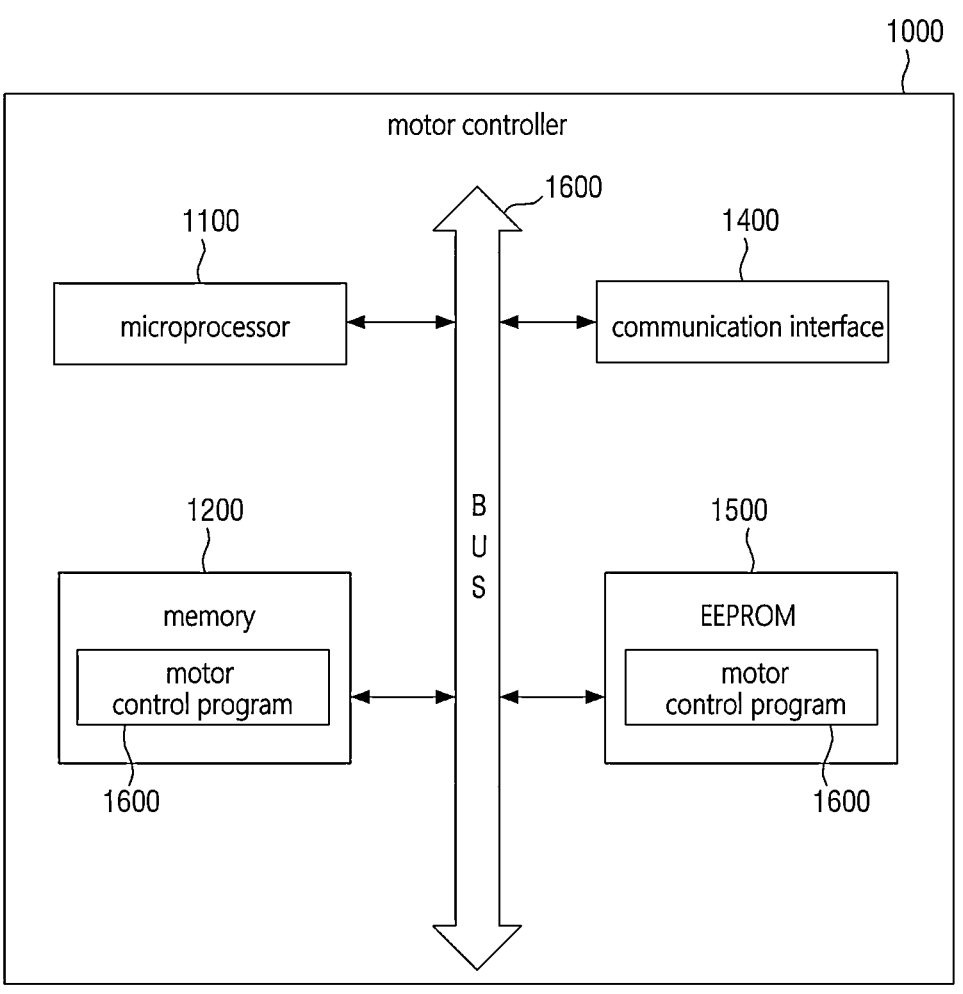
FIG. 7 depicts a hardware configuration diagram of a computing system that may be used as a component in an embodiment of the present disclosure.

FIG. 7 depicts a hardware configuration diagram showing a motor controller 1000 implemented as a computing device.

As shown in FIG. 7, the motor controller 1000 may include one or more microprocessors 1100, a bus 1300, a communication interface 1400, a memory 1200 that loads a computer program executed by the microprocessor 1100 and an EEPROM 1500 that stores a motor control program 1600. However, only components related to the embodiment of the present disclosure are shown in FIG. 7. Accordingly, a person having ordinary skill in the art to which this disclosure pertains may recognize that other general-purpose components may be further included in addition to the components shown in FIG. 7.

Additionally, in some cases, the motor controller 1000 may be configured with some of the components shown in FIG. 7 omitted. Hereinafter, each component of the motor controller 1000 is described.

The microprocessor 1100 may control the overall operation of each component of the motor controller 1000. The microprocessor 1100 may be configured to include at least one of an Electronic Control Unit (ECU), a Central Processing Unit (CPU), a Micro Processor Unit (MPU), a Micro Controller Unit (MCU), a Graphics Processing Unit (GPU), or any device well known in the art of the present disclosure.

Additionally, the microprocessor 1100 may control at least one controller or a vehicle communication network to execute operations/methods according to embodiments of the present disclosure. The motor controller 1000 may include one or more processors.

The memory 1200 may store various data, commands, and/or information. The memory 1200 may load the motor control program 1600 from the EEPROM 1500 to execute operations/methods according to embodiments of the present disclosure.

The bus 1300 may provide communication functions between components of the motor controller 1000. The bus 1300 may be implemented as various types of buses, such as an address bus, a data bus, and a control bus.

The communication interface 1400 may support signal exchange between control devices and sensors within the vehicle. Additionally, the communication interface 1400 may support signal exchange between each MCU within the vehicle and a controller within the vehicle. The communication interface 1400 may be configured to include vehicle communication network technologies such as MAY (Controller Area Network), LIN (Local Interconnect Network), FlexRay, and automotive Ethernet.

The EEPROM 1500 may non-temporarily store the motor control program 1600. The EEPROM 1500 may be replaced with non-volatile memory such as ROM (Read Only Memory), EPROM (Erasable Programmable ROM), flash memory, hard disk, removable disk, or any type of computer-readable recording medium well known in the art to which this disclosure pertains.

The motor control program 1600 may include one or more instructions that cause the microprocessor 1100 to perform operations/methods according to various embodiments of the present disclosure when loaded into the memory 1200. That is, the microprocessor 1100 may perform operations/methods according to various embodiments of the present disclosure by executing loaded instructions.

Embodiments of the present disclosure and the effects according to embodiments thereof have been mentioned with reference to FIGS. 1 to 7. The effects according to the technical idea of the present disclosure are not limited to the forementioned effects, and other unmentioned effects may be clearly understood by those having ordinary skill in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multi-tasking and parallel processing may be advantageous. According to the above-described embodiments, it should not be understood that the separation of various configurations is necessarily required, and it should be understood that the described program components and systems may generally be integrated together into a single software product or be packaged into multiple software products.

The detailed description, those having ordinary skill in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A controller of a motor comprising:
a plurality of capacitors of a first phase, wherein the first phase is one of a plurality of phases applied to the motor;
a plurality of first switching elements of the first phase; and
a plurality of second switching elements of the first phase,
wherein the plurality of capacitors are configured to charge DC voltage from a battery that applies voltage to the motor,
wherein the plurality of first switching elements are configured to convert the DC voltage to AC voltage,
wherein the plurality of second switching elements are configured to switch so that any one of the plurality of capacitors or the plurality of first switching elements is selectively connected to the motor,
wherein the plurality of second switching elements are configured to switch such that one of the plurality of capacitors is connected to the motor in place of a first switching element, among the plurality of first switches, in which an abnormal signal has occurred, and wherein the first phase is a phase including the first switching element in which the abnormal signal has occurred.

2. The controller of claim 1, wherein the plurality of first switching elements of the first phase are configured to determine a torque of the motor according to a sequence of converting the DC voltage in the first phase to the AC voltage by an on-off operation of the plurality of first switching elements.

3. The controller of claim 1, wherein the plurality of first switching elements of the first phase are configured to determine a speed of the motor using a frequency at which the DC voltage of the first phase is converted to the AC voltage by an on-off operation of the plurality of first switching elements.

4. The controller of claim 1, wherein the plurality of second switching elements of the first phase are configured to switch so that at least one phase of the plurality of phases is connected between the plurality of capacitors and the motor and a remaining phase is connected between the plurality of first switching elements and the motor.

5. The controller of claim 1, further comprising:

a resistor between the motor and the plurality of first switching elements, the resistor configured to control a magnetic field of the motor.

6. A method performed by a controller of a motor, the method comprising:

connecting, for a first phase that is one of a plurality of phases applied to the motor, a plurality of capacitors connected in series to the motor instead of a plurality of first switching elements using a plurality of second switching elements;

generating a three-phase voltage using the first phase including the plurality of capacitors connected in series and remaining phases of the plurality of phases each of which including the plurality of first switching elements; and controlling a magnitude of the generated three-phase voltage by an on-off operation of the plurality of first switching elements included in the remaining phases, wherein the first phase is a phase including a first switching element, among the plurality of first switching elements, in which an abnormal signal has occurred.

7. The method of claim 6, wherein connecting the plurality of capacitors comprises:

switching so that the plurality of capacitors of the first phase and the plurality of first switching elements of the first phase are connected in series, and at a same time, one or more of the plurality of capacitors of the first phase or the plurality of first switching elements of the first phase are selectively connected to the motor by an on-off operation of each of the second switching elements of the first phase.

8. The method of claim 6, wherein connecting the plurality of capacitors comprises:

controlling a magnetic field of the motor by adding resistance between the plurality of switching elements of the first phase.

9. The method of claim 6, wherein controlling the magnitude of the generated three-phase voltage comprises:

determining a torque of the motor according to a sequence of converting DC voltage in the remaining phases to AC voltage by an on-off operation of a plurality of first switching elements included in the remaining phases.

10. The method of claim 9, wherein determining the torque of the motor comprises:

controlling a magnitude of the generated three-phase voltage using pulse width modulation (PWM).

11. The method of claim 10, wherein controlling the magnitude of the generated three-phase voltage using PWM comprises:

controlling an average value of the generated three-phase voltage by dividing a time interval of an on-off operation of a plurality of first switching elements included in the remaining phases.

12. The method of claim 6, wherein controlling the magnitude of the generated three-phase voltage comprises:

determining a speed of the motor using a frequency, at which DC voltage of the remaining phases is converted into AC voltage by an on-off operation of a plurality of first switching elements included in the remaining phases.

13. The method of claim 6, wherein controlling the magnitude of the generated three-phase voltage comprises:

providing the magnitude of the three-phase voltage generated according to an on-off operation of the plurality of first switching elements included in the remaining phases to the motor to set a driving mode of a vehicle including the motor to limp home mode.

14. A non-transitory computer-readable recording medium having a program instructions recorded thereon, the program instructions to direct a controller of a motor to perform acts of:

connecting, for a first phase that is one of a plurality of phases applied to the motor, a plurality of capacitors connected in series to the motor instead of a plurality of first switching elements using a plurality of second switching elements;

generating a three-phase voltage using a first phase including the plurality of capacitors connected in series and remaining phases each including the plurality of first switching elements; and controlling a magnitude of the generated three-phase voltage by an on-off operation of the plurality of first switching elements included in the remaining phases, wherein the first phase is a phase including a first switching element, among the plurality of first switching elements, in which an abnormal signal has occurred.

15. The non-transitory computer-readable recording medium of claim 14, wherein connecting the plurality of capacitors comprises:

switching so that the plurality of capacitors of the first phase and the plurality of first switching elements of the first phase are connected in series, and at a same time, and any one of the plurality of capacitors of the first phase or the plurality of first switching elements of the first phase is selectively connected to the motor by an on-off operation of each of the second switching elements of the first phase.

16. The non-transitory computer-readable recording medium of claim 14, wherein connecting the plurality of capacitors comprises:

controlling a magnetic field of the motor by adding resistance between the plurality of switching elements of the first phase.

17. The non-transitory computer-readable recording medium of claim 14, wherein controlling the magnitude of the generated three-phase voltage comprises:

determining a torque of the motor according to a sequence of converting DC voltage in the remaining phases to AC voltage by an on-off operation of a plurality of first switching elements included in the remaining phases.

18. The non-transitory computer-readable recording medium of claim 17, wherein determining the torque of the motor comprises:

controlling a magnitude of the generated three-phase voltage using pulse width modulation (PWM).

19. The non-transitory computer-readable recording medium of claim 14, wherein controlling the magnitude of the generated three-phase voltage comprises:

determining a speed of the motor using a frequency, at which DC voltage of the remaining phases is converted into AC voltage by an on-off operation of a plurality of first switching elements included in the remaining phases.

20. The non-transitory computer-readable recording medium of claim 14, wherein controlling the magnitude of the generated three-phase voltage comprises:

providing the magnitude of the three-phase voltage generated according to an on-off operation of the plurality of first switching elements included in the remaining phases to the motor to set a driving mode of a vehicle including the motor to limp home mode.

* * * * *